United States Patent
Kopton

(10) Patent No.: US 8,740,507 B2
(45) Date of Patent: Jun. 3, 2014

(54) MILLING TOOL, PARTICULARLY FACE-MILLING CUTTER

(75) Inventor: Peter Kopton, Koesching (DE)

(73) Assignee: Audi AG, Ingolstadt (DE)

( * ) Notice: Subject to any disclaimer, the term of this patent is extended or adjusted under 35 U.S.C. 154(b) by 355 days.

(21) Appl. No.: 12/934,792

(22) PCT Filed: Mar. 19, 2009

(86) PCT No.: PCT/EP2009/002031
§ 371 (c)(1), (2), (4) Date: Jan. 26, 2011

(87) PCT Pub. No.: WO2009/118126
PCT Pub. Date: Oct. 1, 2009

(65) Prior Publication Data
US 2011/0123279 A1    May 26, 2011

(30) Foreign Application Priority Data

Mar. 26, 2008 (DE) .......................... 10 2008 015 603

(51) Int. Cl.
*B23C 5/20*        (2006.01)

(52) U.S. Cl.
CPC ........................ *B23C 5/20* (2013.01)
USPC ................................ 407/2; 407/115

(58) Field of Classification Search
USPC ................................ 407/2, 5, 6, 40, 47, 115
IPC ...................................................... B23C 5/20
See application file for complete search history.

(56) References Cited

U.S. PATENT DOCUMENTS

| 3,673,653 | A |   | 7/1972  | Kaser |
|-----------|---|---|---------|-------|
| 3,816,893 | A | * | 6/1974  | Farrow .......................... 407/40 |
| 3,838,724 | A | * | 10/1974 | Buchacher et al. ........... 144/230 |
| 4,848,978 | A | * | 7/1989  | Keritsis ......................... 407/41 |
| 4,966,500 | A | * | 10/1990 | Tsujimura et al. ............. 407/34 |
| 5,026,221 | A |   | 6/1991  | Arai et al. |
| 5,033,916 | A |   | 7/1991  | Dunklau |
| 5,451,122 | A |   | 9/1995  | Noda et al. |

FOREIGN PATENT DOCUMENTS

| CH | 501464 A        |   | 1/1971  |
|----|-----------------|---|---------|
| DE | 19716818 A1     | * | 11/1998 |
| DE | 102005023532 A1 |   | 11/2006 |

(Continued)

OTHER PUBLICATIONS

English translation of DE 19716818.*

*Primary Examiner* — Andrea Wellington
*Assistant Examiner* — Alan Snyder
(74) *Attorney, Agent, or Firm* — Novak Druce Connolly Bove + Quigg LLP

(57) ABSTRACT

The invention relates to a milling tool, particularly a face-milling cutter, with a rotationally symmetrical tool base body which can be driven in rotation and in which at least one pocket-like recess is made on the periphery, with a cutting body which is inserted in the recess, which projects radially and/or axially on the tool base body and which is held by at least one clamping element, on the outer periphery of the milling tool at least one chip guide chamber being made with chip deflecting surfaces for controlled chip removal away from the workpiece surface to be machined. According to the invention, the chip guide chamber is assigned at least one chip guide web which separates the chip guide chamber from the surface of the workpiece.

6 Claims, 4 Drawing Sheets

(56) References Cited

FOREIGN PATENT DOCUMENTS

| | | | |
|---|---|---|---|
| EP | 0123887 A | | 11/1984 |
| GB | 1574126 A | * | 9/1980 |
| JP | 02-145944 | | 12/1990 |
| JP | 724511 U | | 5/1995 |
| JP | 2501372 | | 3/1996 |
| JP | 08-090327 | | 4/1996 |
| WO | 2006125508 A1 | | 11/2006 |

* cited by examiner

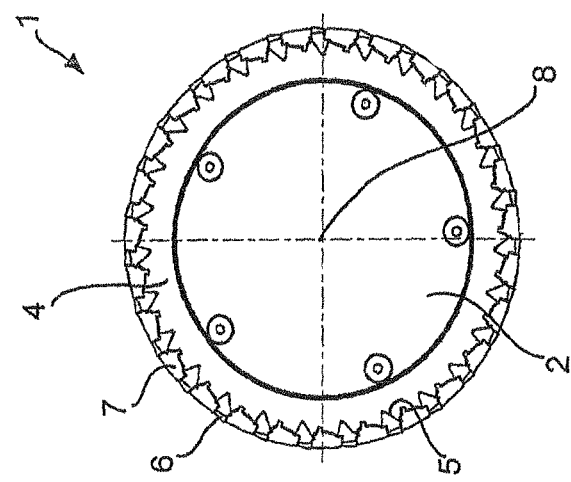
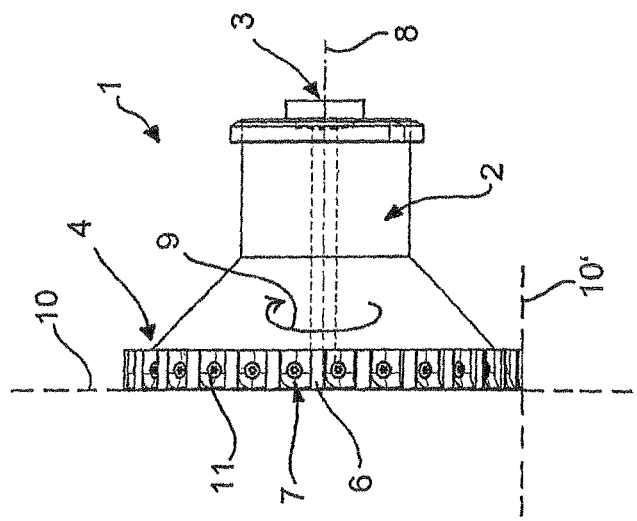

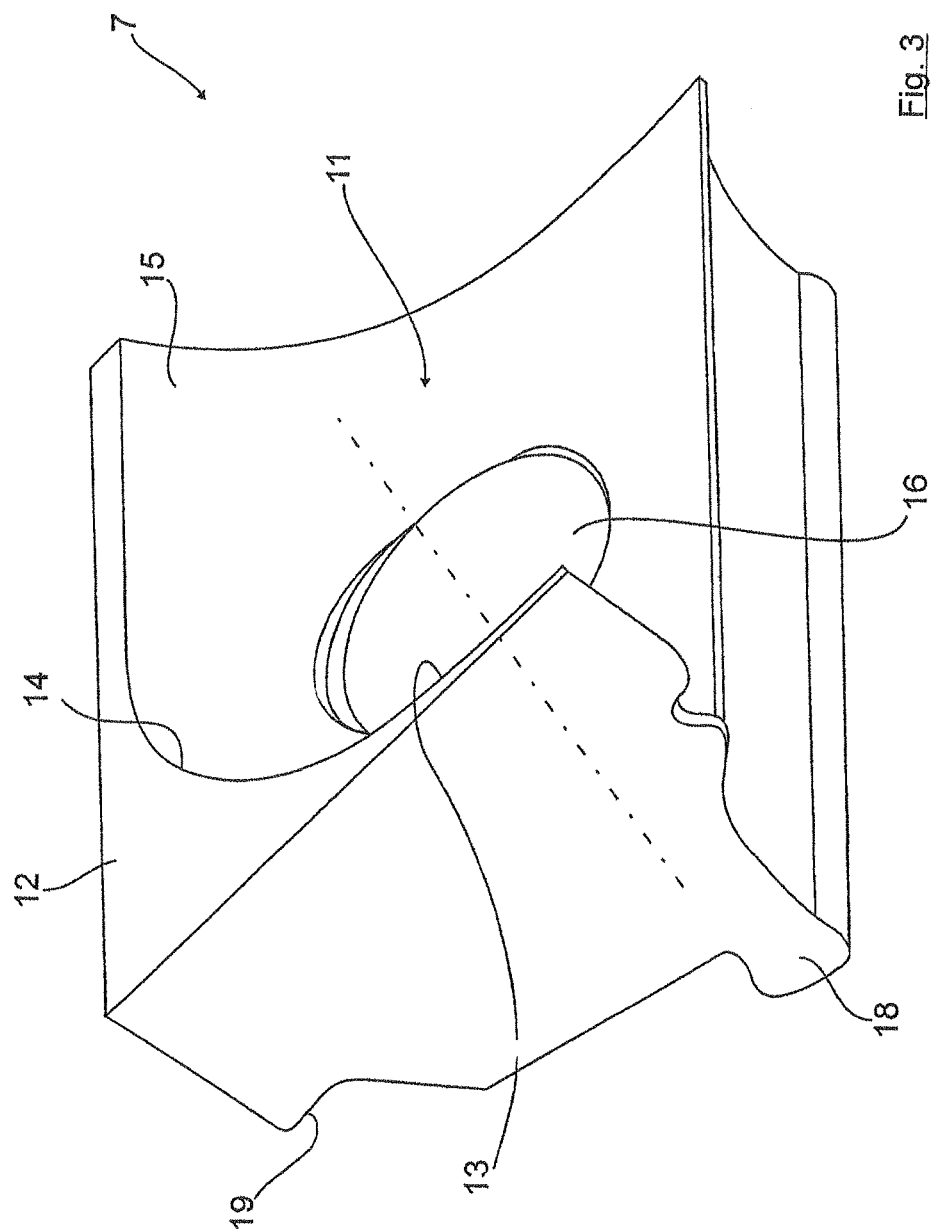

MILLING TOOL, PARTICULARLY FACE-MILLING CUTTER

This invention relates to a milling tool, particularly a face-milling cutter.

BACKGROUND OF THE INVENTION

A generic, known milling tool (DE 101 44 514 A1) consists of a cylindrical tool base body which can be driven in rotation, in which pocket-like recesses are made on the periphery. Cutting bodies are inserted into these recesses, project radially and/or axially on the tool base body, and are held by respectively assigned clamping elements.

In the direction of rotation in front of the cutting bodies, the clamping elements are arranged here such that they lie radially offset to the inside in the fully mounted state relative to the peripheral surface of the tool base body and the cutting edge of the pertinent cutting bodies, by which a chip space for accommodating chips is formed. There are no measures for controlled chip removal with separation of the chip space from the surface to be machined, so that during metal cutting the respective chip can come into unimpeded contact with the workpiece surface to be machined and may in this way potentially damage it. Moreover, here the cutting bodies are held solely by frictional locking against radial centrifugal force so that this arrangement is not suitable for high-speed machining with high rotational speeds and high centrifugal forces. Furthermore, a similar milling tool is known (FR 2 422 468) in which the chip space does not have any separation and thus any controlled chip guidance function toward the workpiece surface to be machined so that here damage of the workpiece surface to be machined by the chip is also possible during metal cutting. Here as well, the cutting bodies are only squeezed with respect to the radial forces so that this mounting is not suitable for high-speed machining.

Furthermore, a milling tool in a so-called facet version is known (DE 103 43 673 A1), where the cutting bodies are attached to mounts which for their part are inserted into cassettes on the tool base body and held. On these cassettes there are chip spaces, but, due to the configuration, here as well the chip is able to come into unimpeded contact with the workpiece surface to be machined and damage it and it is possible for the chips to be cut several times. In another similar embodiment of a milling tool (DE 197 16 818 C2), there are additionally separate, interchangeable chip deflecting elements, but, apparently due to the configuration, the chip here is also able to come into unimpeded contact with the workpiece surface to be machined and damage it, with the possibility for the chips to be cut several times.

Furthermore, a cutting insert for a milling tool is known (DE 10 2005 023 532 A1) in which the cutting edge and a chip deflecting surface are integrated into the cutting insert; this makes this cutting insert very expensive and technically very complex. The chip removed by the cutting edge is to be removed by the special configuration of this complex cutting insert.

The object of the invention is to develop a generic milling tool with a simple and economical structure such that the chips removed by the cutting bodies from the workpiece surface to be machined are transported away in a reliable and controlled manner to prevent damage.

SUMMARY OF THE INVENTION

According to the invention, on the outer periphery of the milling tool at least one chip guide chamber with chip deflecting surfaces for controlled chip removal from the workpiece surface which is to be machined is integrated. According to the broad aspects of the invention, the chip guide chamber is assigned at least one chip guide web which separates the chip guide chamber from the workpiece surface. The chip guide web is made as a partition so that the chip guide chamber is largely closed toward the workpiece with respect to the direction of rotation. In this way controlled chip removal away from the workpiece surface is supported in face milling since the respective chip guide chamber is separated from the workpiece surface by the chip guide web.

Preferably, the chip guide web can be located on the front side in the axial direction of the tool. In the position of use of the milling tool, the chip guide web is then positioned directly on the workpiece surface, as a result of which effective chip removal is further supported.

The chip guide web can be used not only as a partition relative to the workpiece surface, but moreover also can directly or at least partially border the chip guide chamber in a double function. The chip guide web can additionally undergo transition into a chamber wall which borders the chip guide chamber and which extends in the axial direction of the milling tool and thus is located more or less at a right angle to the chip guide web.

In order to further support the removal of chips, the chip guide chamber can be closed not only by means of the chip guide web in the axial direction of the milling tool toward its front side. In addition, the chip guide chamber can be designed to be open to the outside in the radial direction.

Different embodiments are conceivable for technical implementation of the chip guide web. Thus, the chip guide web can be made at least partially in a separate insert part which can be attached to the milling tool. The insert part can thus be adapted to effective chip removal separately from the milling tool both with respect to the material and also with respect to its geometry. Preferably, the separate insert part can be attached directly to the base body of the milling tool, to the cutting body, and/or to the clamping element.

Alternatively, for purposes of reducing components, the chip guide web may not be provided as a separate insert part, but may be integrated at least partially directly in the tool base body, in the clamping element, and/or in the cutting body with uniform material and/or in one piece. In this way, the components which are already present in the milling tool in a double function can additionally also bear the chip guide web.

Thus, on the outer periphery of the clamping element, the chip guide chamber with its deflecting surfaces can be integrated for controlled chip transport away from the workpiece surface to be machined.

The chip guide chamber can preferably be integrated at least partially in the cutting body itself and/or directly in the tool base body. In this case, the chip guide chamber, together with the pocket-like recesses to be provided in it, can be machined into the outer periphery of the tool base body.

According to one embodiment, one respective chip guide chamber at a time with chip deflecting surfaces for controlled chip removal from the workpiece surface to be machined can be integrated on the outer periphery of the clamping elements.

Integration of the chip guide chamber in the tool base body, in the cutting element, or in the clamping element yields a very simple structure which can be produced at low cost with good chip removal function. Maintenance, especially replacement of cutting bodies and/or clamping elements, can be done quickly and easily. The clamping elements can be easily produced since the chip guide chambers with the chip deflecting surfaces are contained exclusively in the clamping elements.

The milling tool can be used as a face-milling cutter, in particular for machining a workpiece surface perpendicular to the axis of rotation. The face-milling cutter has a plurality of cutting bodies which project radially and axially and which are arranged offset on the periphery of the tool base body. The tool base body and/or preferably the chip guide chamber is formed here with a face-side chip guide web lying toward the workpiece surface in the form of a partition so that the chip guide chamber is largely closed toward the workpiece with respect to the direction of rotation. In addition, the chip guide chamber can be open radially to the outside and without webs toward the opposite side. In this way, controlled chip removal away from the workpiece surface is achieved in face milling, since the respective chip guide chamber is separate therefrom through the chip guide web.

Fundamentally, the milling tool can also be equipped as a grooving cutter in which the chip guide chamber in the region of the workpiece surface to be machined has two opposite chip guide webs as groove surfaces. Thus, the chip guide chamber is also largely closed toward the workpiece herewith respect to the direction of rotation, but between the chip guide webs is open radially to the outside for controlled chip removal.

Furthermore, it is proposed that the cutting bodies lie fitted and positively in the recesses on the tool base body and can be positively secured and supported by the assigned clamping elements with respect to radial forces. This type of mounting is especially well-suited for high-speed machining with high rotational speeds of the milling tool, since then the cutting bodies are reliably supported not only by clamping connection, but also by positive connection, and are held locked against centrifugal forces.

Advantageously, on each clamping element in the region of the chip guide chamber there can be a radial through bore for holding a fastening element, especially a clamping screw, as a result of which secure mounting is achieved.

In one embodiment of the clamping element, it can be made as a rocker-clamping element with an axially directed rocker crosspiece for support in a groove on the base of the assigned recess and opposite to the fastening element with a clamping support edge toward the clamping support on the support shoulder of a cutting body. Such a clamping element is located next to a respective cutting body, one cutting body at a time being held by clamping the rocker-clamping element against the support shoulders of the cutting bodies.

In one alternative embodiment, the clamping element can have clamping support edges on both sides opposite the fastening element (without support by way of a rocker crosspiece). The cutting bodies each have support shoulders on both sides so that one clamping element is supported on both sides with its clamping support edges on the support shoulders of the two adjacent cutting bodies. This execution and arrangement also lead to reliable mounting of the cutting bodies.

BRIEF DESCRIPTION OF THE DRAWINGS

FIG. 1 shows the milling head of a face-milling cutter in a side view,

FIG. 2 shows the milling head as shown in FIG. 1 in a front view,

FIG. 3 shows an enlarged perspective of a clamping element as a rocker-clamping element.

DETAILED DESCRIPTION OF THE PREFERRED EMBODIMENTS OF THE INVENTION

Figure 4:
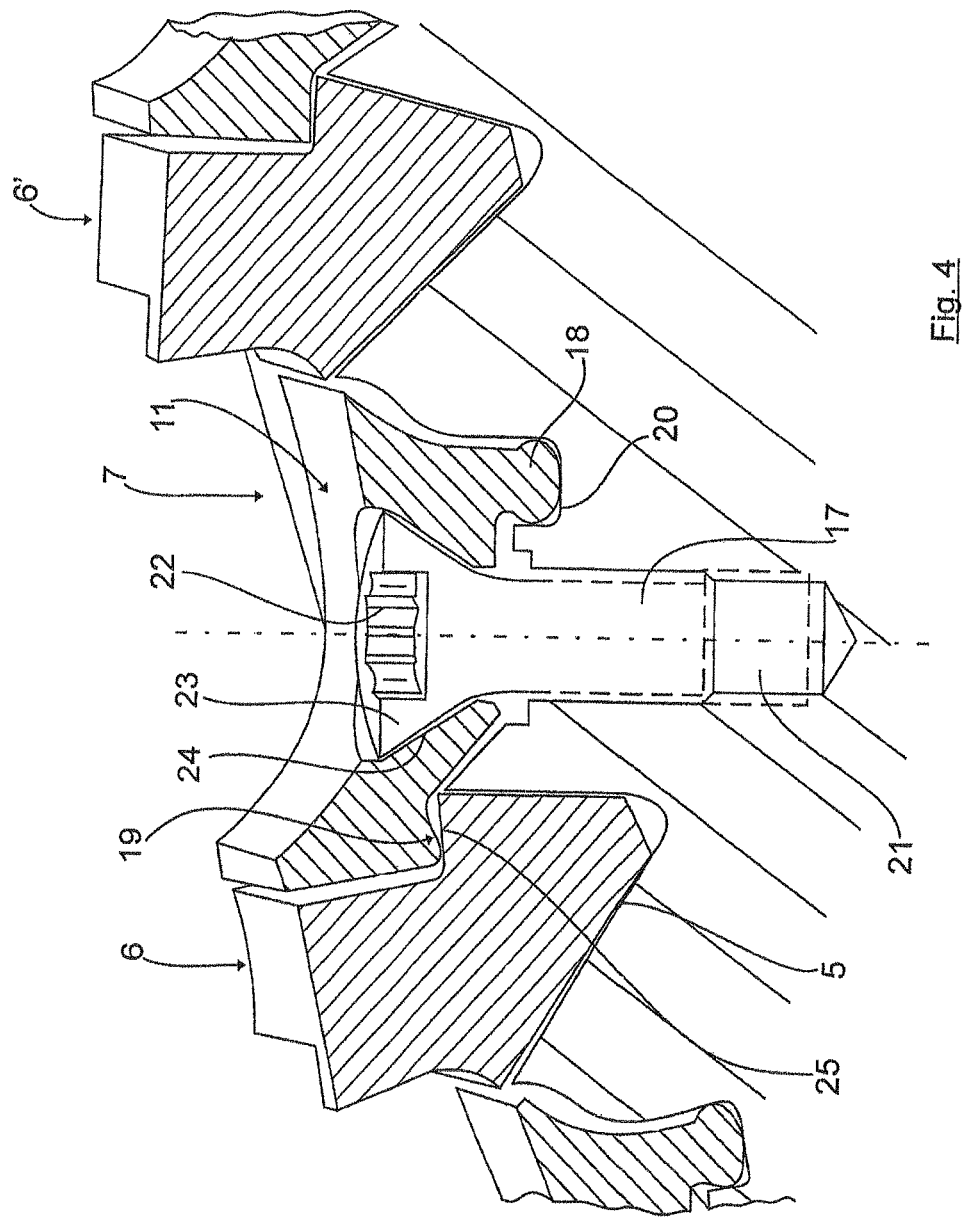
FIG. 4 shows a cross section through a rocker-clamping element and adjacent cutting bodies.

FIGS. 1 and 2 show a face cutter 1 in a side view and a front top view which has a rotationally symmetrical tool base body 2 which widens from a cylindrical region in a conical shape as far as the end-side circular ring 4. In this circular ring 4 on the periphery in succession a plurality of identical pocket-like recesses 5 are made into which on the one hand cutting bodies 6 and clamping elements 7 bordering as clamping jaws are inserted which are further explained in detail using the enlarged depictions of FIGS. 3 to 5. Recesses 5 include a first set of circumferentially spaced recesses in which the cutting bodies 6 are disposed and a second set of circumferentially spaced recesses in which the clamping elements are disposed with each clamping element being disposed between a pair of cutting bodies.

The tool base body 2 is driven around the axis 8 of rotation according to the rotary arrow 9. For metal-cutting facing of a workpiece surface 10 perpendicular to the axis 8 of rotation (or optionally for a workpiece surface 10' axially parallel to the axis 8 of rotation), the cutting bodies 6 project radially and/or axially on the circular ring 4 of the workpiece base body 2 with their cutting edges.

As is apparent from FIG. 1, the chips which have been removed during machining are pushed in front of the respective cutting body 6 in the direction of rotation 9 in the chip guide chambers 11 which are attached to the outer periphery of the clamping elements 7 as trough-shaped depressions.

FIG. 3 shows a clamping element 7 in the form of a rocker-clamping element, enlarged. The clamping element 7 has more or less a block-shaped structure with a chip guide chamber 11 which is made as a depression with respect to the outer peripheral surface 12. Here, a face-side wall region is formed as a chip guide web 13 which forms the face-side partition of the chip guide chamber 11 toward the workpiece surface 10. The chip guide web 13 in a dome 14 undergoes transition into a chamber wall 15 which lies in the peripheral and rotary direction to the cutting body which is adjacent there, so that the chip guide chamber 11 is formed overall as a trough section which is open opposite the direction of rotation and opposite to the workpiece surface 10.

Figure 5:
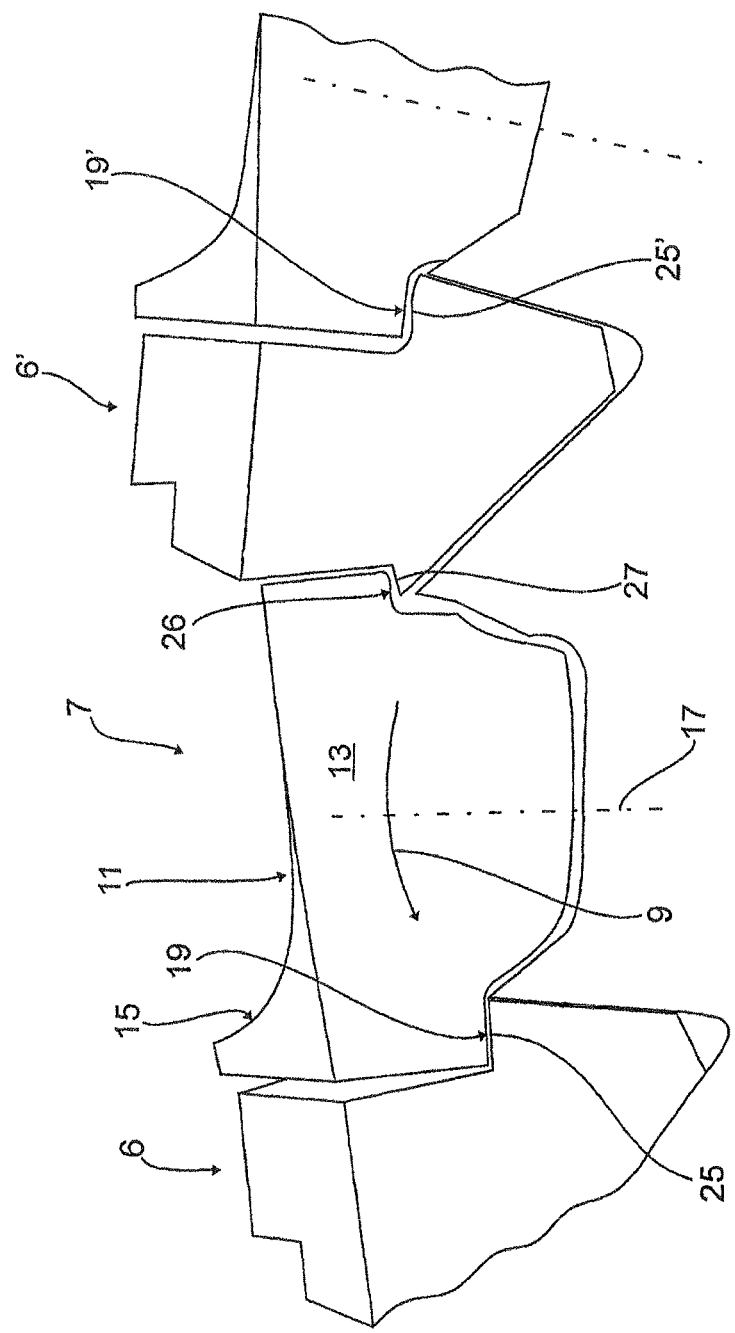
FIG. 5 shows an enlarged front view of a clamping element with two clamping support edges and adjacent cutting bodies.

The clamping element 7, moreover, in the region of the chip guide chamber 11 contains a central, radially directed through bore 16 for accommodating a tightening screw 17 (FIG. 4). Furthermore, on the underside an axially directed, lateral rocker crosspiece 18 and opposite to the through bore 16 a clamping support edge 19 are attached. The mounting function of the clamping element 7 in conjunction with the cutting bodies 6 and the operation of the chip guide chamber 11 are detailed using FIGS. 4 and 5: FIG. 5 shows a section through a mounted clamping element 7 with adjacent cutting bodies 6, 6' in a cutting plane parallel to the workpiece surface 10 through the through bores 16. It shows the shape of the recesses 5 which in the region of the cutting bodies 6, 6' taper down in a cone shape for fitted and positive accommodation of the cutting bodies 6, 6'. Each recess 5 undergoes transition, bordering into a region for accommodating the assigned clamping element 7 with a groove 20 assigned to the rocker crosspiece 18, and a screw bore 21 for insertion of the tightening screw 17. The tightening screw 17 has an inner tool neck 22 and is held countersunk with a flat head 23 in the corresponding conical recess 24 on the bottom of the chip guide chamber 11.

In the illustrated arrangement, the clamping element 7 is supported with the rocker crosspiece 18 in the groove 20 and during tightening of the tightening screw 17 is pressed with its clamping support edge 19 against a support shoulder 25 of the cutting body 6, as a result of which the latter is clamped into the wedge-shaped region of the recess 5 and is securely held positively against centrifugal forces. FIG. 5 shows a representation according to FIG. 4, but from the standpoint of the workpiece surface to be machined (without a cut) with an alternative embodiment of the clamping element 7. This embodiment of the clamping element 7, in addition to the clamping support edge 19, has a second clamping support edge 26 opposite thereof. The clamping support edge 19 is supported according to the embodiment as shown in FIG. 4 on a support shoulder 25 of a (left) cutting body 6, while the opposite clamping support edge 26 is supported on an assigned support shoulder 27 of the other (right) cutting body 6'. Thus, two adjacent cutting bodies 6, 6' at a time are held and braced here with this clamping element 7, the tightening screw 17 here being indicated only abstractly with a dot-dash line.

In conjunction with the direction of rotation (rotary direction arrow 9), it is apparent that the chips, which have been removed by the cutting body 6' from the workpiece surface, travel into the chip guide chamber 11, the chip guide web 13 forming a partition to the workpiece surface. It is important here that the chip guide web 13 or the partition runs out narrowly toward the cutting body 6'. This chip guide web 13 as a partition ensures that the removed chips are kept reliably away from coming into contact with and damaging the workpiece surface to be machined. Transport away from the chip guide chamber 11 takes place by way of the free opening opposite the chip guide web 13.

The invention claimed is:

1. A milling tool comprising:
   a body rotatable about an axis thereof;
   a first plurality of circumferentially spaced recesses disposed along an edge of said body, relative to said axis;
   a second plurality of circumferentially spaced recesses disposed along said edge, having each recess thereof disposed between a successive set of recesses of said first plurality of recesses;
   a plurality of cutting bits each disposed in a recess of said first plurality of recesses and provided with an outwardly facing ledge surface;
   a plurality of deflecting bits each disposed in a recess of said second plurality of recesses, provided with an abutment surface engaging the ledge surface of an adjacent cutting bit, in retaining relation and an outer surface curved in a plane including the axis of said body and a plane disposed orthogonally to said axis; and
   means for retaining each of said deflecting bits in the recess thereof and applying a force for retaining an engaged cutting bit.

2. The milling tool of claim 1 wherein each of said first plurality of recesses is provided with converging surfaces engaged by a cutting bit disposed in said recess.

3. The milling tool of claim 2 wherein each of said cutting bits is provided with a pair of converging surfaces engaging said converging surfaces of said recess in which said cutting bit is disposed.

4. The milling tool of claim 1 wherein outer surfaces of said cutting bits lie in the same plane.

5. The milling tool of claim 1 wherein said retaining means comprises a threaded fastener.

6. The milling tool of claim 1 wherein each of said retaining means includes a portion thereof projecting into a groove in the recess in which said retaining means is disposed.

* * * * *